Dec. 22, 1925.   
W. J. SHACKELTON  
INDUCTANCE DEVICE  
Filed April 3, 1923
1,566,777
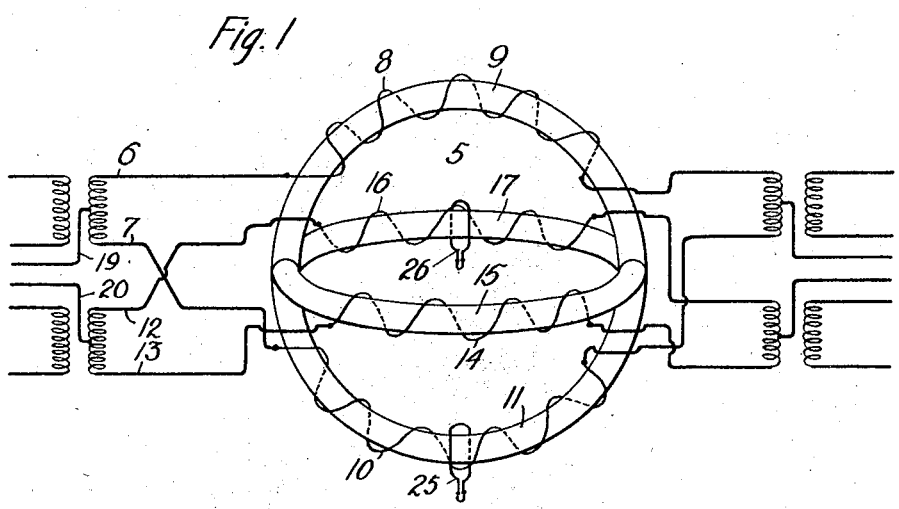
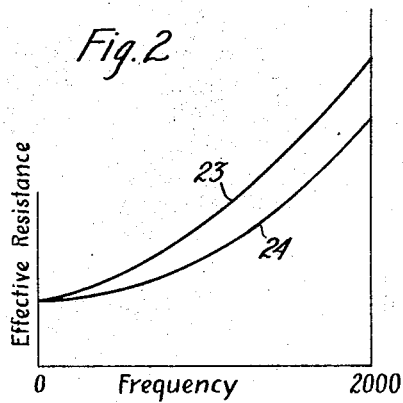
Inventor:  
William J. Shackelton,  
by       Atty.

Patented Dec. 22, 1925.

1,566,777

UNITED STATES PATENT OFFICE.

WILLIAM J. SHACKELTON, OF SCOTCH PLAINS, NEW JERSEY, ASSIGNOR TO WESTERN ELECTRIC COMPANY, INCORPORATED, OF NEW YORK, N. Y., A CORPORATION OF NEW YORK.

INDUCTANCE DEVICE.

Application filed April 3, 1923. Serial No. 629,555.

*To all whom it may concern:*

Be it known that I, WILLIAM J. SHACKELTON, a citizen of the United States, residing at Scotch Plains, in the county of Union, State of New Jersey, have invented certain new and useful Improvements in Inductance Devices, of which the following is a full, clear, concise, and exact description.

This invention relates to inductance devices and more particularly it relates to loading coils such as are employed in telephone systems for loading more than one circuit as may be done, for example, in the case of two physical circuits and their derived phantom circuit.

It is frequently desirable in inductance devices, such as loading coils, to have windings which are located on different parts of a branched core accurately balanced as to their electrical effects. For example, the two windings on a gimbal type loading coil for one side circuit should have the same effective resistances since otherwise cross-talk between that side circuit and the other side circuit or the phantom circuit might result, particularly if the difference in effective resistance is appreciable and the coil is intended for use on a long line employing amplifiers.

It is an object of this invention to provide a method and an arrangement for equalizing the effective resistance of two windings of an inductance device.

If an ordinary resistance element of the proper value were added in series with the winding of lower effective resistance, the two windings could be balanced for a single frequency but could not be balanced for a wide range of frequencies because it has been found that the effective resistance of the windings of a loading coil increases rapidly with the frequency and the rate of increase is generally different for different windings.

In order that a substantial balance may be obtained between the two windings of normally unequal effective resistances, it is proposed, in one form of this invention, to add a direct current resistance to one of the windings sufficient to make the two windings have the same effective resistance for zero frequency and then to place a short-circuited turn around the core section having the winding which has the smaller rate of increase in its resistance with frequency. The resistance of this short-circuited turn may then be adjusted until the effective resistances of the two windings under comparison are equal for some frequency, for example, in the upper range of the frequencies to be transmitted through the windings. When such an adjustment has been made, it has been found that for frequencies between the chosen frequency and zero frequency that the effective resistance of the winding to be corrected will be increased an amount increasing with frequency so that the effective resistances of the two windings will be substantially the same for a wide frequency range.

Referring to the drawings, Fig. 1 represents this invention embodied in a gimbal type loading coil and Fig. 2 illustrates, by curves, how the effective resistance of the windings of the loading coil may vary with the frequency.

Referring to Fig. 1, a loading coil having a branched core structure 5 is disclosed for simultaneously loading two side circuits and the derived phantom circuit of a signaling system, such as a telephone system, for example. The side circuit comprising conductors 6 and 7 is loaded by means of a winding 8 on the branch 9 and a winding 10 on the branch 11. The other side circuit comprising conductors 12 and 13 is loaded by a winding 14 on a branch 15 and a winding 16 on a branch 17. The manner in which these four windings are arranged to simultaneously load the phantom circuit comprising conductors 19 and 20, is well known in the art and need not be disclosed here in detail.

In order that such a loading coil may operate satisfactorily for simultaneously loading the two side circuits and the derived phantom circuit, conditions which give rise to cross-talk between side circuits or one side circuit and a phantom circuit should be carefully eliminated as far as possible. One source of cross-talk difficulty in such a unitary loading structure is the fact that the various branches of the loading coil structure are not exactly symmetrical due to variations in manufacture and consequently the effective resistance of the windings on the various core sections will not be exactly the same and very frequently the effective resistance of the winding on one core section will be quite different from that of the mate core section. Even a small difference in these effective resistances will cause appreciable cross-talk difficulties. While it is possible to balance up these effective resistances at any given frequency by the addition of resistance in series with the winding having the lower resistance, such a correction, however, in general will not make the balance hold at all frequencies within the audio range because the rate of increase with frequency of the effective resistance on one winding will not always be the same as the rate of increase for its mate winding. This difference in the rate of increase of effective resistance with frequency may be due to a variety of causes such as variations in the eddy current losses in the core material, etc.

Fig. 2 shows, by means of curves, a typical example of how the effective resistance of a loading coil winding may vary with the frequency, and in this figure, ordinates represent values of the effective resistance while the abscissae represent frequency values. Curve 23, for example, may represent the variation with frequency of the effective resistance of winding 8 on core section 9, while curve 24 may represent the effective resistance for its mate winding, namely, winding 10 on core section 11. It will be assumed that the two windings have the same resistance for zero frequencies or, if such is not the case, that a small D. C. resistance has been added to one of the windings to balance the resistance for zero frequency so that curves 23 and 24 start from the same point at zero frequency. Curve 23 indicates that the effective resistance of winding 8 increases much more rapidly with frequency than does the effective resistance of winding 10 so that as the frequency increases there is more and more a divergence of the effective resistance values of the two windings, until at some frequency, for example, 2000 cycles, the difference between the effective resistances of the two windings may be as great as 10% or more.

In accordance with this invention it is proposed that a short-circuited turn 25 be placed around the core section 11 which has the winding of lower effective resistance and adjusting the resistance of this short-circuited loop until, for example, the effective resistance for 2000 cycles of winding 10 has been brought up to the value for winding 8 at that frequency. This will cause the curves for windings 8 and 10 to coincide at 2000 cycles and since the effective resistance added to the winding by the short-circuited turn will also increase with the frequency it will be found that for frequencies intermediate 2000 cycles and zero cycles the two effective resistance curves will substantially coincide so that by means of the short-circuited turn, a substantial balance may be had between the two windings for a wide frequency range.

It is obvious, of course, that the short-circuited loop may be adjusted to have the two curves coincide for any particular frequency other than 2000 cycles and it may be done, for example, for 3000 cycles or any other desired frequency depending principally upon the frequency range for which it is desired to have a substantial balance between the effective resistances of the windings. It is, of course, obvious, if windings 14 and 16 for the other side circuit have different rates of increase of their effective resistances with frequency, that the one having the lower rate of increase may be provided with a short-circuited turn such as the loop 26 around core section 17 and the resistance of this loop may be adjusted as described above to provide a substantial balance of the effective resistances of windings 14 and 16 for a wide frequency range.

When such a balance of the effective resistance of the windings of the loading coil has been made, it has been found that the cross-talk between the various circuits may be substantially reduced, if not entirely eliminated.

It is to be understood that this invention is not limited in its application to loading coils of the type described above but is capable of use in other types of inductance devices, and that the particular corrective means employed may be variously modified without departing in any wise from the spirit of this invention as defined in the appended claims.

The invention claimed is:

1. An inductance device having a branched core, windings on different branches of said core, two of said windings having substantially the same effective resistances at one frequency and substantially different effective resistances at another frequency, and separate means for equalizing the effective resistances of said windings at said last mentioned frequency.

2. An inductance device comprising a branched core, a plurality of windings on different parts of said core, two of said windings having effective resistances which vary at a different rate with increase in frequency, and a short-circuited loop of wire around the branch of said core having the winding with the lower effective resistance.

3. An inductance device comprising a branched core, a plurality of windings on different parts of said core, and means for equalizing the effective resistances of two of said windings comprising a separate loop of wire around the branch of said core having the winding of the lower effective resistance.

4. An inductance device comprising a branched core having a plurality of windings on different parts of said core, the effective resistances of two of said windings increasing at a different rate with increase in frequency, and a loop of wire around the branch of said core having the winding of lower effective resistance adjusted to equalize the effective resistance of the winding of that branch with the effective resistance of the other of said two windings for a particular frequency other than zero frequency.

5. An inductance device comprising a branched core having a plurality of windings on different branches, the effective resistances of two of said windings increasing at a different rate with increase in frequency, and a short-circuited turn around the branch having the winding with the lower rate of increase, the resistance of said short-circuited turn being adjusted to equalize the effective resistances of the said two windings for a frequency near the upper range of frequencies to be transmitted efficiently through said device.

6. The method of reducing cross-talk between the windings of a multi-branched loading coil, two of the windings of which have the effective resistances increasing at different rates with frequency, which method comprises equalizing the direct current resistances of the said two windings, placing a short-circuited turn around the branch containing the winding of the lower rate of increase with frequency of effective resistance, and adjusting the resistance of the short-circuited turn until the effective resistances of the said two windings are substantially equalized for a frequency substantially removed from zero frequency.

In witness whereof, I hereunto subscribe my name this 2nd day of April A. D., 1923.

WILLIAM J. SHACKELTON.